March 7, 1933. C. H. OLIVER 1,900,581
BRAKE TESTING INSTRUMENTALITY
Filed Oct. 10, 1931
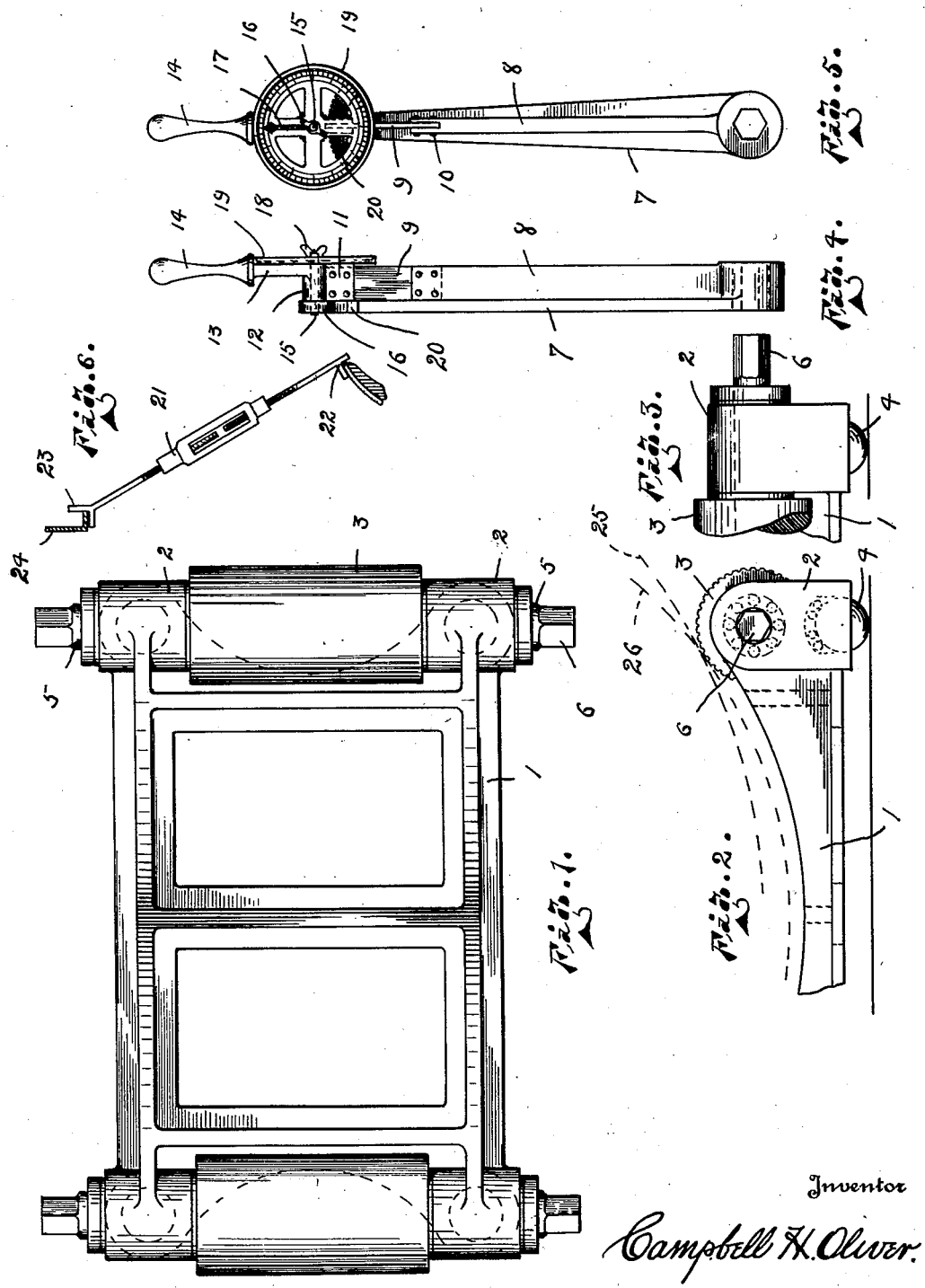
Inventor
Campbell H. Oliver.
By
Geo Stevens.
Attorney Patented Mar. 7, 1933

1,900,581

UNITED STATES PATENT OFFICE

CAMPBELL H. OLIVER, OF HIBBING, MINNESOTA

BRAKE TESTING INSTRUMENTALITY

Application filed October 10, 1931. Serial No. 568,011.

This invention relates to automobile brake adjusting instrumentalities, the principal object being to provide a more simple and practical device of this character than heretofore known whereby one wheel at a time of the automobile is manipulated for adjustment.

Another object is to provide such a device having simple means upon the operating lever for determining the relative frictional contact of the brake after being adjusted.

Still other objects and advantages of the invention will appear in the following description thereof.

Referring now to the accompanying drawing, forming part of this application, and wherein like reference characters indicate like parts:

Figure 1 is a plan view of one of the wheel supporting dollys;

Figure 2 is a side elevation of one corner of Figure 1;

Figure 3 is a similar view taken at right angles to Figure 2;

Figure 4 is an elevation of the operating lever and handle;

Figure 5 is a similar view to Figure 4 taken at right angles thereto; and

Figure 6 is an elevation of the portable foot-lever holder.

I am aware that somewhat similar devices wherein a single wheel at a time is manipulated are known in the art, but the instant construction is believed to have advantages over same and which may prove beneficial to those versed in the art to which it appertains.

1 represents a skeleton like reinforced metal chassis, substantially rectangular in shape and supporting at its four corners vertically disposed bearing members 2 forming horizontal journals for the transverse wheel supporting rollers 3, and also carrying in the lowermost face thereof the castor roller 4 for convenience in movement about; which castor balls and bearings for the rollers may be of any desired construction preferably of ball or roller bearing type, as illustrated.

The shafts 5 of the rollers 3 extend beyond the bearings at either end and terminate in rectangularly shaped pintles 6 for selective reception of the operating lever 7. This lever is removable and applicable to any of the four pintles as convenience may require and has formed upon the outermost side thereof a web like rib 8 which extends upwardly the major length of the lever terminating in a slot into which is fitted a stout spring 9, the strength of which is predetermined as by experiment and which is fixed therein as by rivets or bolts indicated at 10. The upper end of this spring 9 is similarly attached to a bifurcated depending portion 11 of the lever carrying hub 12 mounted above same and which hub has formed integral therewith the hand lever shank 13 which terminates in the hand hold member 14.

A shaft 15 is mounted longitudinally and centrally of the hub 12 carrying thereupon adjacent the rearmost face of the hub a small spur gear 16 and upon its opposite end the pointer 17. The pointer may be adjustably carried upon the shaft 15 as by the thumb nut 18, if so desired for reasons hereinafter described. A dial 19 is carried either loosely upon the shaft 15 or fixed to the lever shank 13 and hub as desired.

A small geared quadrant is formed upon the extreme upper end of the lever 7 and which is in constant mesh with the spur gear 16 so that when the lever 7 is applied to one of the pintles 6 for rotating same after an automobile wheel has been mounted on the dolly, and stress is applied in eithr direction upon the hand lever 14 with the object of ultimately rotating the rollers in the dolly, such pressure or stress will be automatically indicated upon the dial 19 by the movement of the pointer and it will be noted that as the lever 14 is drawn, say to the left as in viewing the drawing, the pointer will also move to the left by virtue of the rotation of the shaft 15. And, as before stated, if so desired, either the pointer or dial may be loose upon their mountings, and may be set at the place where initial movement of the wheel occurs so that any additional force required to move the wheel may be indicated minutely by the further movement of the lever, or the dial may be fixed in respect to the lever 14 and the movement of the pointer thereupon simply noted in each instance when the respective brake is adjusted.

As a means for holding the foot brake lever in a predetermined position I have shown a turnbuckle rod as at 21, the lower end of which has a right angularly shaped terminus as at 22 for engagement upon the foot lever and the opposite end having a Y mouth as at 23 for impingement against the lower edge of the instrument board 24, though of course other means for accomplishing like results may be resorted to without departing from the spirit of the invention.

Furthermore I have illustrated for convenience the position of different sized wheels when applied to the dolly, for example the relative position of a 40" casing is shown in dotted lines at 25, and that of a 30" casing in dotted lines at 26, and, if desired, the rollers 3 may have their circumferential faces longitudinally fluted as illustrated.

Having thus described my invention, what I claim and desire to secure by Letters Patent, is:

A stress indicating lever having a laterally extending web upon one side thereof terminating materially short of the free end of said lever, a geared quadrant upon the free end of the lever, a yieldable spring member fixed to the outermost end of said web forming an extension thereof, a circular dial having an inwardly extending hub portion beneath and to which the upper end of the spring member is fixed forming a support for the dial, a shaft extending through said hub member and carrying a gear in constant mesh with said quadrant, a handle like extension above the quadrant for yieldable operation of the lever, and a pointer carried by said shaft for indicating upon the dial the stress upon the handle before movement of the lever occurs.

In testimony whereof I affix my signature.

CAMPBELL H. OLIVER.